United States Patent [19]
Okano et al.

[11] 4,376,617
[45] Mar. 15, 1983

[54] TURBOCHARGER FOR USE IN AN INTERNAL COMBUSTION ENGINE

[75] Inventors: Hiroshi Okano, Mishima; Masami Yamazaki, Toyota, both of Japan

[73] Assignee: Toyota Jidosha Kogyo Kabushiki Kaisha, Aichi, Japan

[21] Appl. No.: 226,095

[22] Filed: Jan. 19, 1981

[30] Foreign Application Priority Data

Apr. 17, 1980 [JP] Japan .................. 55-049536

[51] Int. Cl.³ .................................... F04B 17/00
[52] U.S. Cl. .......................... 417/407; 415/178
[58] Field of Search ................. 417/405–409; 415/116, 117, 178

[56] References Cited

U.S. PATENT DOCUMENTS

| 2,578,785 | 12/1951 | Davis | 417/407 X |
| 2,822,974 | 2/1958 | Mueller | 417/407 X |
| 2,860,827 | 11/1958 | Egli | 417/407 |
| 2,938,659 | 5/1960 | Judson et al. | 417/407 X |
| 2,973,136 | 2/1961 | Greenwald | 417/407 |
| 3,054,554 | 9/1962 | Buchi | 417/407 X |
| 3,893,786 | 7/1975 | Rahnke et al. | 415/178 |

OTHER PUBLICATIONS

Brown Boveri Rev. (Switzerland), vol. 58, No. 4-5, (Apr.-May 1971), pp. 130-133.

*Primary Examiner*—Tony M. Argenbright
*Attorney, Agent, or Firm*—Stevens, Davis, Miller & Mosher

[57] ABSTRACT

A turbocharger comprising a center housing and a turbine housing. The center housing has at its one end a radially outwardly projecting flange which has an annular end face. The turbine housing has at its one end a radially outwardly projecting flange which has an annular end face. The turbine housing is fixed onto the center housing so that the annular end face of the turbine housing is in contact with the annular end face of the center housing. An annular air passage is formed between the annular end faces of the turbine housing and the center housing. The annular air passage is connected to the diffuser or the air discharge chamber of the compressor of the turbocharger via an air inflow passage for feeding a cooling air into the annular air passage.

11 Claims, 6 Drawing Figures

TURBOCHARGER FOR USE IN AN INTERNAL COMBUSTION ENGINE

DESCRIPTION OF THE INVENTION

The present invention relates to a turbocharger for use in an internal combustion engine.

In a mass-produced small turbocharger for use in a vehicle, in order to reduce the weight and the size of the turbocharger and also reduce the manufacturing cost of the turbocharger, the center housing and the turbine housing of the turbocharger are interconnected to each other by means of a band coupling having a V-shaped cross-section in such a way that the end face of the center housing abuts against the end face of the turbine housing and, then, the end face of the turbine housing is pressed onto the end face of the center housing by means of the band coupling which extends over the center housing and the turbine housing. In addition, in such a small turbocharger for use in a vehicle, a desirable direction of the exhaust gas outlet opening of the turbine housing is different in response to the difference in type of engine and, therefore, it is preferable that the turbine housing can be rotated relative to the center housing. Consequently, in such a turbocharger, as mentioned above, the turbine housing is connected to the center housing by means of the band coupling so that the turbine housing can be rotated relative to the center housing. In such a turbocharger, since an exhaust gas, having a high temperature, flows within the turbine housing, the temperature of the turbine housing becomes extremely high. Consequently, the heat of the turbine housing is transferred to the center housing via the contact zone between the end face of the turbine housing and the end face of the center housing and, as a result, the center housing is heated. However, if the temperature of the center housing becomes high, since bearings, arranged within the center housing for supporting the rotary shaft, are heated, lubricating oil deteriorates and, as a result, a problem occurs in that the performance of the bearings will be reduced. In addition, if the compressor housing is heated by the heat escaping from the turbine housing to the center housing, the temperature of air flowing within the compressor housing is increased and, as a result, another problem occurs in that the energy, which is necesary to compress the air, will be increased.

An object of the present invention is to provide a turbocharger capable of reducing the amount of heat escaping from a turbine housing to a center housing as much as possible by compulsorily cooling the contact zone between the turbine housing and the center housing.

According to the present invention, there is provided a turbocharger having a rotary shaft, comprising: a center housing rotatably supporting the rotary shaft therein and having axially spaced first and second end portions, said first end portion having a radially outwardly extending annular flange which has an end face circumferentially extending about the axis of the rotary shaft; a compressor housing fixed onto the second end portion of said center housing and having an impeller rotatably arranged therein and fixed onto the rotary shaft, said compressor housing having therein a compressed air passage located downstream of said impeller and including a diffuser and an air discharge chamber; a turbine housing having a turbine wheel rotatably arranged therein and fixed onto the rotary shaft, said turbine housing having a radially outwardly extending annular flange which is arranged adjacent to the annular flange of the first end portion of said center housing and has an end face circumferentially extending about the axis of the rotary shaft; means for maintaining the end face of the annular flange of said turbine housing and the end face of the annular flange of said center housing in a contacting state to fix said turbine housing onto said center housing; a closed annular air passage formed between the end face of the annular flange of said turbine housing and the end face of the annular flange of said center housing; an air inflow passage interconnecting said compressed air passage to said annular air passage for feeding air into said annular air passage from said compressed air passage, and; an air outflow passage connected to said annular air passage for discharging the air from said annular air passage.

The present invention may be more fully understood from the description of preferred embodiments of the invention set forth below, together with the accompanying drawings.

DESCRIPTION OF PREFERRED EMBODIMENTS

Figure 1:
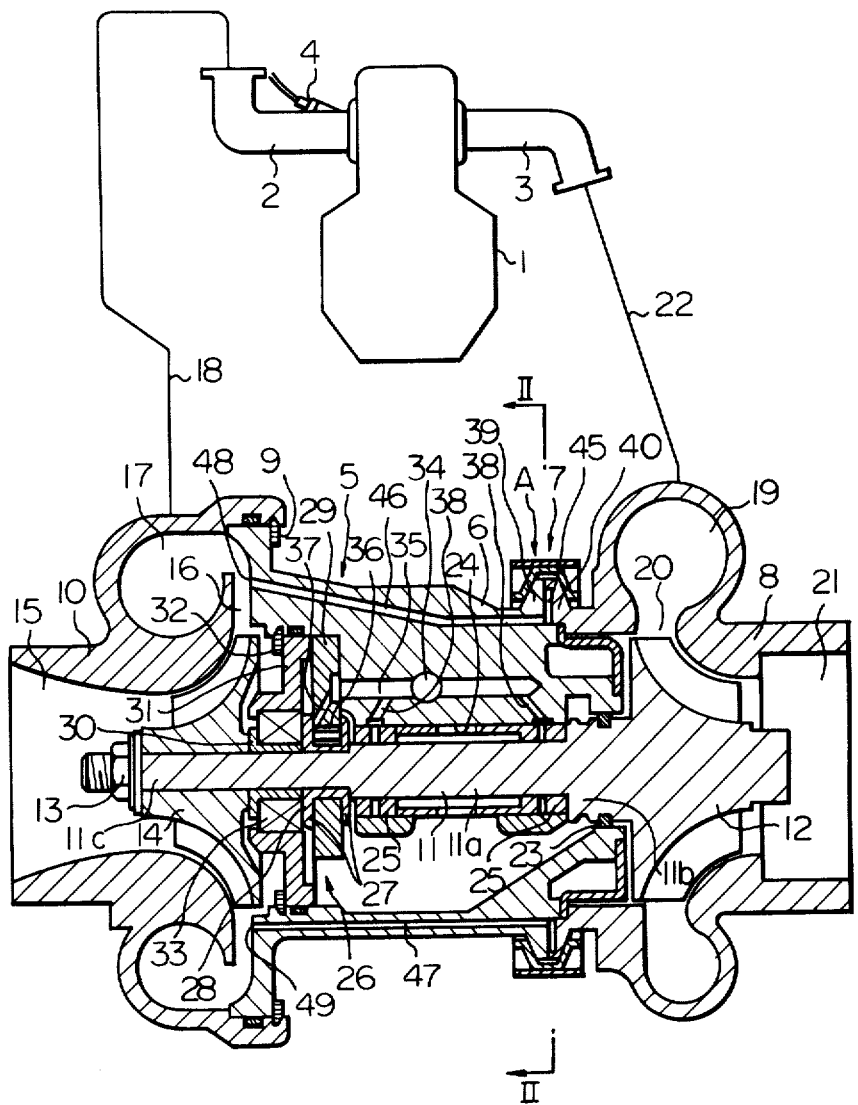
FIG. 1 is a cross-sectional side view of an embodiment of a turbocharger according to the present invention.

Referring to FIG. 1, 1 designates an engine body, 2 an intake manifold, 3 an exhaust manifold, 4 a fuel injector, and 5 a turbocharger. The turbocharger 5 comprises a center housing 6, a turbine housing 8 secured onto one end of the center housing 6 by a band 7, a compressor housing 10 secured onto the other end of the center housing 6 by a snap ring 9, a rotary shaft 11 rotatably inserted into the inside of the center housing 6, a turbine wheel 12 formed in one piece on one end of the rotary shaft 11, and an impeller 14 fixed onto the other end of the rotary shaft 11 by a nut 13. An air inlet 15, a vaneless diffuser 16 and a scroll shaped air discharge chamber 17 are formed in the compressor housing 10, and the air discharge chamber 17 is connected to the intake manifold 2 via an air duct 18. On the other hand, the turbine housing 8 has a scroll shaped exhaust gas inflow chamber 19, a turbine nozzle 20 and an exhaust gas outlet 21 therein, and the exhaust gas inflow chamber 19 is connected to the exhaust manifold 3 via an exhaust duct 22. When the engine is operating, the compressed air within the air discharge chamber 17, which is compressed by the rotating motion of the impeller 14, is fed into the intake manifold 2 via the air duct 18. Then, fuel is injected from the fuel injector 4 into the air which is fed into the intake manifold 2 and, thus, a mixture is formed within the intake manifold 2. After this, the mixture thus formed is fed into the cylinders of the engine body 1.

The exhaust gas, discharged from the cylinders of the engine body 1 into the exhaust manifold 3, is fed into the exhaust gas inflow chamber 19 via the exhaust duct 22. The exhaust gas, fed into the exhaust gas inflow chamber 19, is injected from the turbine nozzle 20 to provide the rotating force for the turbine wheel 12 and, then, the exhaust gas is discharged from the exhaust gas outlet 21.

As illustrated in FIG. 1, the rotary shaft 11 comprises a central portion 11a, an increased diameter portion 11b and a reduced diameter portion 11c. A position ring 23 for sealing is inserted between the center housing 6 and the increased diameter portion 11b of the rotary shaft 11. In addition, a pair of spaced floating radial bearings 25 are arranged within a cylindrical bore 24 which is formed within the central housing 6. The rotary shaft 11 is rotatably supported by a pair of the floating radial bearings 25. In order to axially support the rotary shaft 11, a thrust bearing 26 is arranged on the reduced diameter portion 11c of the rotary shaft 11. The thrust bearing 26 comprises a runner member 28 having a pair of disc shaped runners 27 thereon, and a stationary bearing plate 29 arranged between the runners 27 and slightly spaced from the runners 27. The runner member 28 is fixed onto the reduced diameter portion 11c of the rotary shaft 11 via a spacer 30 and the impeller 14 by the nut 13, and the stationary bearing plate 29 is fixed onto the center housing 6 via a partition member 31 by a snap ring 32. In addition, a seal 33, which is constructed in the form of a mechanical seal, is arranged between the partition member 31 and the spacer 30. A lubricating oil inlet port 34 and a lubricating oil distribution hole 35 are formed in the center housing 6, and the lubricating oil inlet port 34 is connected to the lubricating oil feed pump (not shown). A lubricating oil outflow bore 36, extending in parallel to the axis of the rotary shaft 11, is formed in the stationary bearing plate 29. This lubricating oil outflow bore 36 is connected to the lubricating oil distribution hole 35 via a lubricating oil bore 37. The lubricating oil is fed into the lubricating oil distribution hole 35 from the lubricating oil inlet port 34 and then fed into the lubricating oil outflow bore 36 via the lubricating oil bore 37. After this, the lubricating oil flows into the clearances between the stationary bearing plate 29 and the runners 27 and, thus, the lubricating operation of the thrust bearing 26 is carried out. A pair of lubricating oil feed bores 38, each extending from the lubricating oil distribution hole 35 towards the corresponding floating radial bearings 25, is formed in the center housing 6, and the lubricating operation of the floating radial bearings 25 is carried out by the lubricating oil flowing out from the lubricating oil feed bores 38.

Figure 2:
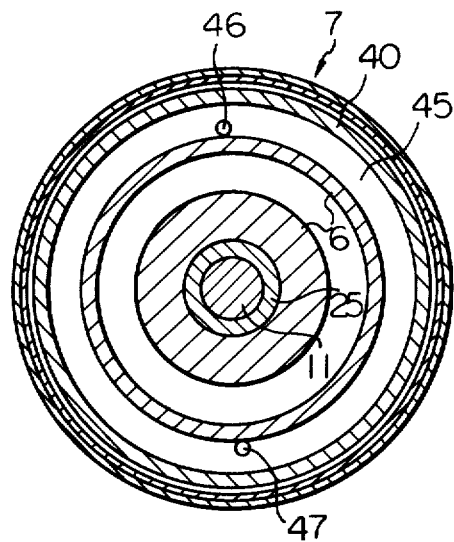
FIG. 2 is a cross-sectional view taken along the line II—II in FIG. 1.
Figure 3:
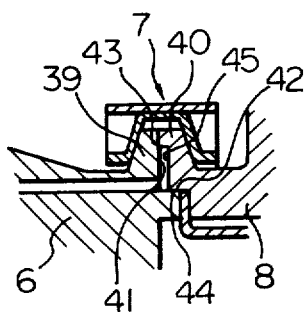
FIG. 3 is an enlarged cross-sectional side view of a portion indicated by the arrow A in FIG. 1.

Referring to FIGS. 1 and 3, a radially outwardly projecting annular flange 39 is formed in one piece on the outer periphery of the end portion of the center housng 6, and a radially outwardly projecting annular flange 40 is formed in one piece on the outer periphery of the end portion of the turbine housing 8. As will be understood from FIG. 3, the annular flange 39 has an outer diameter which is the same as that of the annular flange 40. The end face of the annular flange 39 has a L-shaped cross-section. A radially vertically extending annular face 41 of the L-shaped end face of the annular flange 39 forms a contacting face which is in contact with the flange 40, and a cylindrical face 42 of the L-shaped end face of the annular flange 39 forms a fitting face which is fitted into the flange 40. On the other hand, the annular flange 40 has a radially vertically extending annular face 43 forming a contacting face which is in contact with the annular face 41 of the annular flange 39 and, in addition, the annular flange 40 has a cylindrical face 44 forming a fitting face which is fitted on the cylindrical face 42 of the annular flange 39. As illustrated in FIGS. 1 through 3, an annular groove 45, having a rectangular cross-section and extending along the entire periphery of the annular flange 40, is formed on the annular face 43 of the annular flange 40. As illustrated in FIG. 1, an air inflow passage 46, interconnecting the diffuser 16 to the annular groove 45, is formed in the center housing 6 and, in addition, an air outflow passage 47, interconnecting the annular groove 45 to the diffuser 16, is formed in the center housing 6. From FIG. 1, it will be understood that an opening 48 of the air inflow passage 46, which is open to the diffuser 16, is arranged near the outlet portion of the diffuser 16, and that an opening 49 of the air outflow passage 47, which is open to the diffuser 16, is arranged near the inlet portion of the diffuser 16. As is known to those skilled in the art, when the turbocharger 5 is operated, the pressure in the diffuser 16 is increased from the inlet portion thereof towards the outlet portion thereof and, therefore, the pressure, acting on the opening 48, becomes larger than that acting on the opening 49. Consequently, a part of the air flowing within the diffuser 16 flows into the annular groove 45 via the air inflow passage 46 and, then, flows out again into the diffuser 16 via the air outflow passage 47. As mentioned above, since air is caused to compulsorily flow within the annular groove 45, the annular flange 40 of the turbine housing 8 is cooled by the air flowing within the annular groove 45.

The cylindrical face 44 of the annular flange 40 is loosely fitted onto the cylindrical face 42 of the annular flange 39 with a small clearance so that the turbine housing 8 can be rotated relative to the center housing 6. Consequently, when the annular flanges 39 and 40 are interconnected to each other by means of the band 7 as illustrated in FIG. 3, only the annular face 43 of the annular flange 40, which is located on the outside of the annular groove 45 of the annular flange 40, is firmly pressed onto the annular face 41 of the annular flange 39. As illustrated in FIG. 1, the turbine housing 8 is not in contact with the center housing 6 except for the contacting region between the annular face 41 of the annular flange 39 and the annular face 43 of the annular flange 40. Consequently, a large part of the heat transferred to the center housing 6 from the turbine housing 8 passes through the contacting zone between the annular face 41 of the annular flange 39 and the annular face 43 of the annular flange 40. However, since the annular groove 45 is formed on the annular face 43 of the annular flange 40, the area of the above-mentioned contacting zone is very small. In addition, the above-mentioned contacting zone is cooled by air flowing within the annular groove 45. As a result, it is possible to considerably reduce the amount of heat transferred from the turbine housing 8 to the center housing 6.

Figure 4:
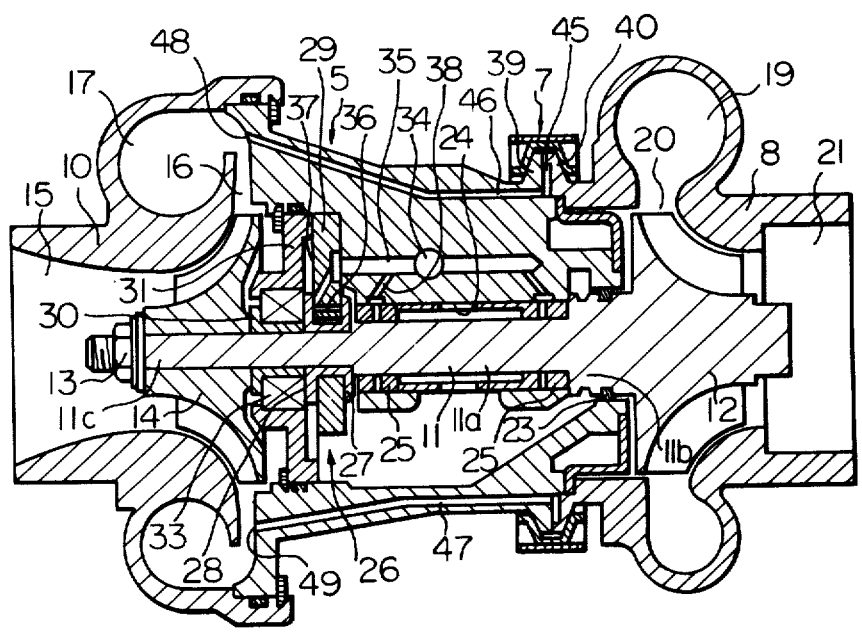
FIG. 4 is a cross-sectional side view of a further embodiment according to the present invention.

FIG. 4 illustrates another embodiment. In this embodiment, the opening 48 of the air inflow passage 46 is arranged in the air discharge chamber 17, and the opening 49 of the air outflow passage 47 is arranged in the diffuser 16. The pressure in the air discharge chamber 47 is greater than that in the diffuser 16 and, therefore, the air in the air discharge chamber 47 is fed into the annular groove 45 via the air inflow passage 46.

Figure 5:
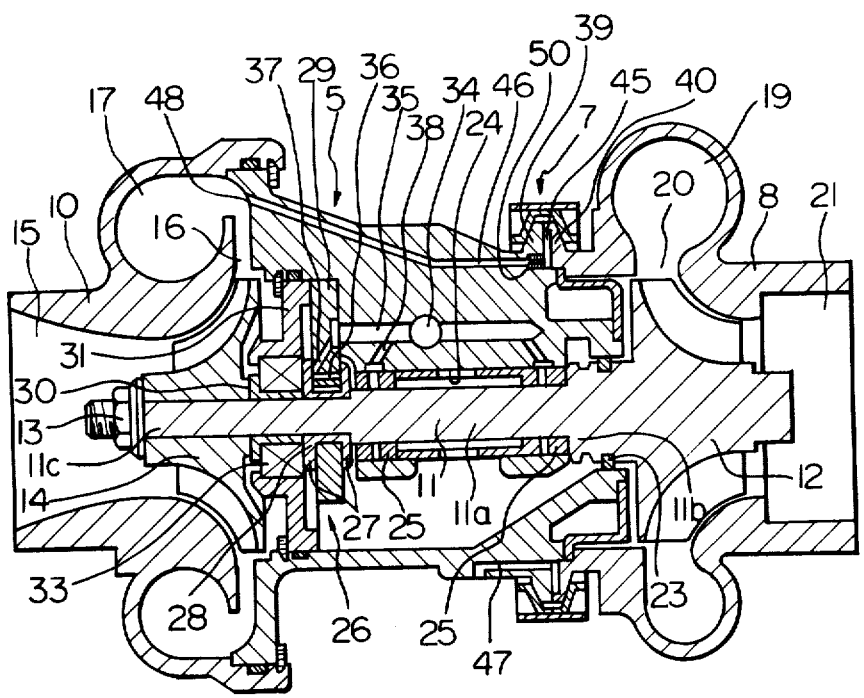
FIG. 5 is a cross-sectional side view of a still further embodiment according to the present invention.

FIG. 5 illustrates a further embodiment. In this embodiment, the opening 48 of the air inflow passage 46 is arranged in the air discharge chamber 17, and the air outflow passage 47 is open to the atmosphere. In addition, a jet 50, functioning as a restricted opening, is arranged in the air inflow passage 46. Also, in this embodiment, air in the air discharge chamber 17 is fed into the annular groove 45 via the air inflow passage 46.

Figure 6:
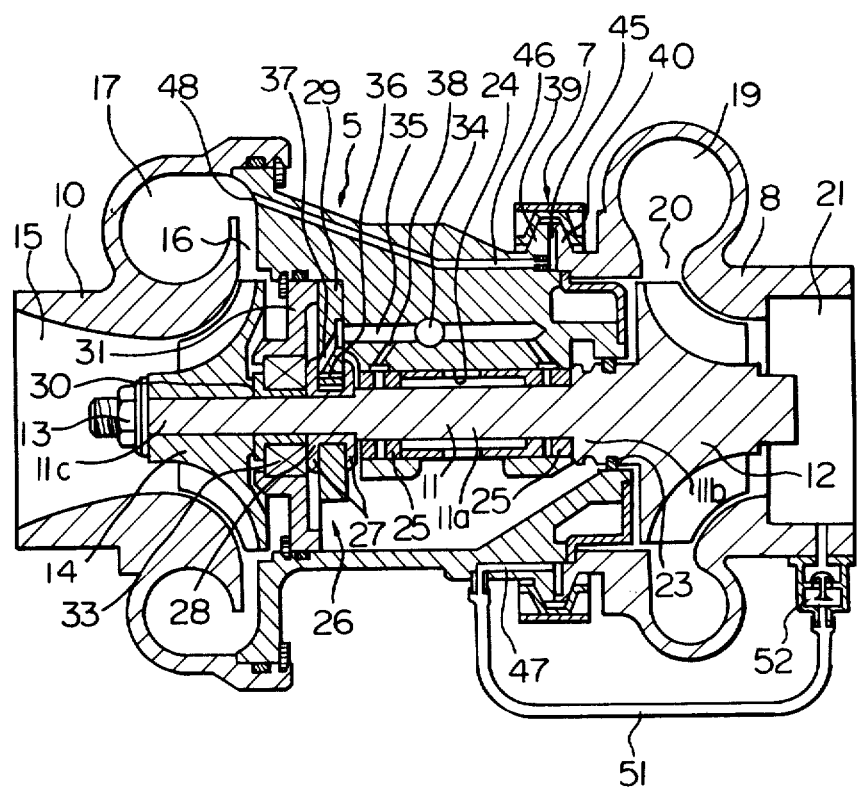
FIG. 6 is a cross-sectional side view of a still further embodiment according to the present invention.

FIG. 6 illustrates a still further embodiment. In this embodiment, the opening 48 of the air inflow passage 46 is arranged in the air discharge chamber 17, and the air outflow passage 47 is connected to the exhaust gas outlet 21 via a conduit 51 and a check valve 52 which serves to prevent exhaust gas from flowing into the annular groove 45 from the exhaust gas outlet 21. Also, in this embodiment, air in the air discharge chamber 17 is fed into the annular groove 45 via the air inflow passage 46.

According to the present invention, since it is possible to surpress the increase in temperature of the center housing, it is possible to prevent lubricating oil from deteriorating due to the increase in temperature of the lubricating oil, and improve the durability of bearings. In addition, since it is possible to surpress the increase in temperature of the compressor housing, which increase is caused by the heat of the turbine housing, the increase in temperature of air passing through the compressor is reduced and, as a result, the efficiency of the compressor can be improved. Furthermore, since it is possible to surpress the increase in temperature of the center housing, it is possible to maintain the rotary shaft at a relatively low temperature. Consequently, since the axial elongation of the rotary shaft, which is caused by a thermal expansion, is very small, it is possible to minimize the clearance between the turbine blade and the inner wall of the turbine housing and the clearance between the impeller and the inner wall of the compressor housing. As a result of this, it is possible to improve the efficiency of the turbine and the compressor.

While the invention has been described by reference to specific embodiments chosen for purposes of illustration, it should be apparent that numerous modifications could be made thereto by those skilled in the art without departing from the basic concept and scope of the invention.

We claim:

1. A turbocharger having a rotary shaft, comprising:
a center housing rotatably supporting the rotary shaft therein and having axially spaced first and second end portions, said first end portion having a radially outwardly extending annular flange which has an end face circumferentially extending about the axis of the rotary shaft;
a compressor housing fixed onto the second end portion of said center housing and having an impeller rotatably arranged therein and fixed onto the rotary shaft, said compressor housing having therein a compressed air passage located downstream of said impeller and including a diffuser and an air discharge chamber;
a turbine housing having a turbine wheel rotatably arranged therein and fixed onto the rotary shaft, said turbine housing having a radially outwardly extending annular flange which is arranged adajacent to the annular flange of the first end portion of said center housing and has an end face circumferentially extending about the axis of the rotary shaft;
means for maintaining the end face of the annular flange of said turbine housing and the end face of the annular flange of said center housing in a contacting state to fix said turbine housing onto said center housing;
a closed annular air passage formed between the end face of the annular flange of said turbine housing and the end face of the annular flange of said center housing;
an air inflow passage interconnecting said compressed air passage to said annular air passage for feeding air into said annular air passage from said compressed air passage, and;
an air outflow passage connected to said annular air passage for discharging the air from said annular air passage.

2. A turbocharger as claimed in claim 1, wherein said air inflow passage and said air outflow passage are formed in said center housing.

3. A turbocharger as claimed in claim 1, wherein said diffuser has an inlet portion and an outlet portion, and said air inflow passage has an air inlet opening which is open to the outlet portion of said diffuser, said air outflow passage having an air outlet opening which is open to the inlet portion of said diffuser.

4. A turbocharger as claimed in claim 1, wherein said air inflow passage has an air inlet opening which is open to said air discharge chamber, and said air outflow passage has an air outlet opening which is open to said diffuser.

5. A turbocharger as claimed in claim 1, wherein said air inflow passage has an air inlet opening which is open to said compressed air passage, and said air outflow passage has an air outlet opening which is open to the atmosphere.

6. A turbocharger as claimed in claim 5, wherein a jet is arranged in said air inflow passage.

7. A turbocharger as claimed in claim 1, wherein said air inflow passage has an air inlet opening which is open to said compressed air passage, and said air outflow passage has an air outlet opening which is open to an exhaust gas outlet formed in said turbine housing and arranged downstream of said turbine wheel.

8. A turbocharger as claimed in claim 7, wherein a check valve is arranged in said air outflow passage for preventing an exhaust gas from flowing into said annular air passage from said exhaust gas outlet.

9. A turbocharger as claimed in claim 1, wherein said maintaining means comprises a band having a V-shaped cross-section.

10. A turbocharger as claimed in claim 1, wherein the end face of the annular flange of said center housing comprises a radially extending annular face perpendicular to the axis of said rotary shaft, and a cylindrical face circumferentially extending about the axis of the rotary shaft, the end face of the annular flange of said turbine housing comprising a radially extending annular face which is arranged perpendicular to the axis of said rotary shaft and is in contact with the annular face of said center housing, and a cylindrical face which circumferentially extends about the axis of the rotary shaft and is loosely fitted onto the cylindrical face of said center housing.

11. A turbocharger as claimed in claim 10, wherein said annular air passage is an annular groove formed on the annular face of said turbine housing.

* * * * *